US012156260B2

(12) United States Patent
Xu et al.

(10) Patent No.: US 12,156,260 B2
(45) Date of Patent: Nov. 26, 2024

(54) RANDOM ACCESS METHOD AND APPARATUS BASED ON A TIME ADJUSTMENT VALUE

(71) Applicant: HUAWEI TECHNOLOGIES CO., LTD., Guangdong (CN)

(72) Inventors: Bin Xu, Beijing (CN); Bingzhao Li, Beijing (CN); Lei Chen, Beijing (CN); Hong Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 317 days.

(21) Appl. No.: 17/546,123

(22) Filed: Dec. 9, 2021

(65) Prior Publication Data

US 2022/0104281 A1 Mar. 31, 2022

Related U.S. Application Data

(63) Continuation of application No. PCT/CN2020/091653, filed on May 21, 2020.

(30) Foreign Application Priority Data

Jun. 12, 2019 (CN) .......................... 201910506543.3

(51) Int. Cl.
*H04W 74/0833* (2024.01)
*H04W 72/0446* (2023.01)
(Continued)

(52) U.S. Cl.
CPC ... *H04W 74/0841* (2013.01); *H04W 72/0446* (2013.01); *H04W 72/23* (2023.01); *H04W 74/002* (2013.01); *H04W 74/0866* (2013.01)

(58) Field of Classification Search
CPC ........... H04W 56/001; H04W 72/0446; H04W 72/0833; H04W 72/23; H04W 72/12;
(Continued)

(56) References Cited

U.S. PATENT DOCUMENTS 10,390,321 B2 * 8/2019 Han ...................... H04W 76/14
11,089,634 B2 * 8/2021 Tu ..................... H04W 74/0833
(Continued)

FOREIGN PATENT DOCUMENTS

CN 101541092 A 9/2009
CN 101730255 A 6/2010
(Continued)

OTHER PUBLICATIONS

English translation of CN 109788548 printed Mar. 2024 (Year: 2024).*
(Continued)

*Primary Examiner* — William D Cumming

(57) ABSTRACT

A random access method and apparatus are provided. The method includes: a terminal device obtains a position of the terminal device and a position of a network device, the terminal device determines a time adjustment value based on the position of the terminal device and the position of the network device, and the terminal device sends a random access preamble based on the time adjustment value and a random access channel (RACH) resource configured by the network device. Based on this solution, the terminal device may determine the time adjustment value based on the position of the terminal device and the position of the network device, and adjust a time for sending the random access preamble on the RACH resource. This helps avoid a problem that random access preamble receiving time windows overlap, thereby increasing a success rate of accessing the network device by the terminal device.

18 Claims, 8 Drawing Sheets

(51) Int. Cl.
*H04W 72/23* (2023.01)
*H04W 74/00* (2009.01)
*H04W 74/08* (2024.01)

(58) Field of Classification Search
CPC ..... H04W 76/14; H04W 4/70; H04W 40/248; H04W 74/0833; H04W 72/21; H04W 72/52
USPC .......................................................... 370/350
See application file for complete search history.

(56) References Cited

U.S. PATENT DOCUMENTS

| | | | | |
|---|---|---|---|---|
| 11,128,359 | B2* | 9/2021 | Zhou | H04W 72/23 |
| 11,229,059 | B2* | 1/2022 | Jian | H04W 72/12 |
| 11,246,147 | B2* | 2/2022 | Zhang | H04W 28/0268 |
| 11,259,255 | B2* | 2/2022 | Wang | H04W 52/367 |
| 11,284,446 | B2* | 3/2022 | Liu | H04W 72/0453 |
| 11,388,690 | B1* | 7/2022 | Bai | H04W 56/0045 |
| 11,445,540 | B2* | 9/2022 | Goto | H04W 72/0446 |
| 11,678,287 | B2* | 6/2023 | Lin | H04W 40/22 370/350 |
| 11,770,859 | B2* | 9/2023 | Liu | H04W 72/0453 370/329 |
| 11,831,377 | B2* | 11/2023 | Zhou | H04W 24/10 |
| 11,902,028 | B2* | 2/2024 | Xiong | H04W 74/0833 |
| 2009/0238126 | A1 | 9/2009 | Sato et al. | |
| 2012/0314652 | A1 | 12/2012 | Ahn et al. | |
| 2016/0112975 | A1* | 4/2016 | Dinan | H04W 56/001 370/350 |
| 2016/0249312 | A1* | 8/2016 | Han | H04W 76/14 |
| 2019/0207662 | A1* | 7/2019 | Zhou | H04W 72/0446 |
| 2020/0022097 | A1* | 1/2020 | Wang | H04L 5/001 |
| 2020/0059935 | A1* | 2/2020 | Qian | H04W 72/52 |
| 2020/0137804 | A1* | 4/2020 | Jian | H04W 72/0446 |
| 2020/0137805 | A1* | 4/2020 | Tu | H04W 74/0833 |
| 2020/0196327 | A1* | 6/2020 | Zhang | H04W 72/21 |
| 2020/0329506 | A1* | 10/2020 | Liu | H04W 4/70 |
| 2021/0022175 | A1* | 1/2021 | Wei | H04W 72/0446 |
| 2021/0175964 | A1 | 6/2021 | Kusashima et al. | |
| 2021/0360562 | A1* | 11/2021 | Lin | H04W 40/248 |
| 2022/0021432 | A1* | 1/2022 | Zhou | H04W 24/08 |
| 2022/0104281 | A1* | 3/2022 | Xu | H04W 56/0045 |
| 2022/0150954 | A1* | 5/2022 | Hussain | H04W 72/1268 |
| 2022/0217669 | A1* | 7/2022 | Bai | H04W 8/24 |
| 2022/0368468 | A1* | 11/2022 | Xiong | H04W 76/27 |
| 2022/0385520 | A1* | 12/2022 | Liu | H04W 24/08 |
| 2023/0156659 | A1* | 5/2023 | Li | H04W 68/02 455/458 |
| 2023/0171765 | A1* | 6/2023 | Hong | H04W 76/30 370/329 |
| 2023/0413340 | A1* | 12/2023 | Shah | H04W 74/0841 |
| 2024/0147478 | A1* | 5/2024 | Babaei | H04W 72/23 |
| 2024/0155660 | A1* | 5/2024 | Wang | H04W 72/0446 |
| 2024/0179789 | A1* | 5/2024 | Shah | H04W 4/70 |

FOREIGN PATENT DOCUMENTS

| | | | | | |
|---|---|---|---|---|---|
| CN | 102711273 | A | | 10/2012 | |
| CN | 103945471 | A | | 7/2014 | |
| CN | 107734631 | A | * | 2/2018 | ........... H04L 5/0055 |
| CN | 107734709 | A | | 2/2018 | |
| CN | 108737963 | A | | 11/2018 | |
| CN | 109219153 | A | * | 1/2019 | ........... H04L 5/0048 |
| CN | 109788548 | A | | 5/2019 | |
| WO | 2012106798 | A1 | | 8/2012 | |
| WO | 2019097922 | A1 | | 5/2019 | |

OTHER PUBLICATIONS

English translation of CN 109219153 printed Mar. 2024 (Year: 2024).*
Interdigital Inc., On Initial Access and RACH Procedures for NTN. 3GPP TSG RAN WG 1 Meeting #96bis, Xi'an, China, Apr. 8-12, 2019, R1-1904858, 5 pages.
Panasonic, Issues on Timing Advance and RACH for NTN. 3GPP TSG RAN WG1 #97, Reno, USA, May 13-17, 2019, R1-1906264, 4 pages.
Extended European Search Report issued in EP20823227.2, dated Apr. 28, 2022, 12 pages.
Nokia et al, "Doppler Compensation, Uplink Timing Advance, Random Access and UE Location in NTN", 3GPP TSG RAN WG1 Meeting #96bis, R1-1904650, Apr. 8, 2019-Apr. 12, 2019, total 15 pages.
3GPP TR 38.821 V0.6.0, 3rd Generation Partnership Project; Technical Specification Group Radio Access Network; Solutions for NR to support non-terrestrial networks (NTN) (Release 16), Apr. 2019, total 55 pages.
International Search Report and Written Opinion issued in PCT/CN2020/091653, dated Jul. 29, 2020, 8 pages.
3GPP TSG-RAN WG2 Meeting#106 Tdoc R2-1908246: "Random Access Procedure and RACH Capacity in NTN", ZTE, Sanechips, MediaTek Inc, Ericsson, Huawei, HiSilicon, May 13-17, 2019 total 14 pages.

* cited by examiner

RANDOM ACCESS METHOD AND APPARATUS BASED ON A TIME ADJUSTMENT VALUE

CROSS-REFERENCE TO RELATED APPLICATIONS

This application is a continuation of International Application No. PCT/CN2020/091653, filed on May 21, 2020, which claims priority to Chinese Patent Application No. 201910506543.3, filed on Jun. 12, 2019. The disclosures of the aforementioned applications are hereby incorporated by reference in their entireties.

TECHNICAL FIELD

This application relates to the field of mobile communication technologies, and in particular, to a random access method and apparatus.

BACKGROUND

In a wireless communication process, a terminal device needs to obtain uplink synchronization with a network device through a random access procedure, to perform subsequent communication. Before random access, the network device broadcasts a random access channel occasion (RACH Occasion for short, or RO for short) resource to the terminal device, and the terminal device performs random access based on the RO resource broadcast by the network device. The RO resource includes a time domain resource and a frequency domain resource. One RO resource may also be referred to as one RACH resource.

The random access procedure mainly includes the following steps.

Step 1: The terminal device selects a random access preamble (preamble for short) and sends the preamble on the RO resource.

Main functions of the preamble are to notify the network device that the terminal device initiates a random access request, and enable the network device to estimate a transmission delay between the network device and the terminal device. Specifically, the network device may determine the transmission delay between the network device and the terminal device based on sending time and receiving time of the preamble. A RACH resource corresponding to the RO may indicate preamble sending time.

Step 2: After sending the preamble, the terminal device calculates a random access radio network temporary identifier (RA-RNTI) based on the RO resource for sending the preamble, and receives, within a random access response (RAR) receiving window by using the RA-RNTI, a RAR identified by the network device by using a RA-RNTI.

The terminal device can correctly receive the RAR only when the network device and the terminal device use a same RA-RNTI. To ensure that the network device and the terminal device use the same RA-RNTI, the network device and the terminal device need to calculate the RA-RNTI by using a time-frequency position of a same RO resource.

If the terminal device does not correctly receive, within the RAR receiving window, the RAR sent by the network device, step 1 is repeatedly performed.

The foregoing random access procedure is usually applied to a scenario in which distances between different terminal devices in a cell of a same network device and the network device differ slightly, or it is understood as that transmission delays between different terminal devices and the network device differ slightly. Therefore, when different terminal devices that select a same RO resource to send preambles send the preambles, time points at which the preambles reach the network device differ slightly.

But in some other scenarios (for example, a non-terrestrial network (NTN) scenario, where a network device is located on a satellite), distances between different terminal devices in a cell of a same network device and the network device differ greatly. As a result, transmission delays between different terminal devices and the network device differ greatly, and time points at which preambles of different terminal devices that select a same RO resource to send the preambles reach the network device differ greatly.

For example, FIG. 2 is an example schematic diagram of sending preambles by different terminal devices by using a same RO resource. A terminal device 1 is a terminal device closest to a network device, and a terminal device 2 is a terminal device farthest from the network device. In addition, a delay in sending information (for example, a preamble) by the terminal device 1 to the network device is a minimum one-trip delay in sending information by all terminal devices served by the network device to the network device, and is represented by MinDelay, and a delay in sending information (for example, a preamble) by the terminal device 2 to the network device is a maximum one-trip delay in sending the information by all the terminal devices served by the network device to the network device, and is represented by MaxDelay.

It can be learned from FIG. 2 that when different terminal devices send preambles by using a same RO resource, the network device first receives the preamble sent by the terminal device 1, a delay from a time point at which the network device sends the RO resource to a time point at which the network device receives the preamble sent by the terminal device 1 is 2*MinDelay, and a delay from a time point at which the network device sends the RO resource to a time point at which the network device receives the preamble sent by the terminal device 2 is 2*MaxDelay. It may be understood as that a time interval from a time point at which the network device receives a first preamble (sent by the terminal device 1) to a time point at which the network device receives the last preamble (sent by the terminal device 2) is 2*MaxDelay−2*MinDelay, and may also be represented by 2*(MaxDelay−MinDelay). Therefore, to ensure that the network device can receive preambles sent by all the terminal devices served by the network device, a minimum preamble receiving time window configured on the network device should be 2*(MaxDelay−MinDelay).

When one RO resource corresponds to one preamble receiving time window, if a RO periodicity is configured to be small, preamble receiving time windows corresponding to different RO resources may overlap. Consequently, when receiving a preamble at a time domain position of an overlapping part, the network device cannot identify a specific RO resource corresponding to the preamble, and cannot calculate a correct RA-RNTI. For example, FIG. 3 is an example schematic diagram of sending preambles by different terminal devices by using different RO resources. A terminal device 1 and a terminal device 2 in FIG. 3 are the terminal devices defined in FIG. 2. The terminal device 1 selects a RO resource 1 to send a preamble, the terminal device 2 selects a RO resource 2 to send a preamble, and a preamble receiving time window corresponding to the RO resource 1 and a preamble receiving time window corresponding to the RO resource 2 have an overlapping part in terms of time. Consequently, when receiving a preamble at a time domain position of the overlapping part, the network device cannot identify a specific RO resource corresponding to the preamble, and cannot calculate a correct RA-RNTI. If the RO periodicity is increased, a random access capacity of an entire system is reduced.

SUMMARY

Example embodiments of the present disclosure provide a random access method and apparatus, to increase a success rate of accessing a network device by a terminal device without reducing a random access capacity of an entire system.

According to a first aspect, this application provides a random access method. The method includes: A terminal device obtains a position of the terminal device and a position of a network device; the terminal device determines a time adjustment value based on the position of the terminal device and the position of the network device; and the terminal device sends a random access preamble based on the time adjustment value and a random access channel (RACH) resource configured by the network device. Based on this solution, the terminal device supports positioning. In this case, the terminal device may determine the time adjustment value based on the position of the terminal device and the position of the network device, and adjust, based on the time adjustment value, time for sending the random access preamble on the RACH resource. Therefore, the network device receives, at the same time, within a small time range, or within a short preamble receiving time window, random access preambles sent on a same RACH resource, and receives, at different times, within different small time ranges, or within different short preamble receiving time windows, random access preambles sent on different RACH resources, to help avoid a problem that random access preamble receiving time windows overlap, and increase a success rate of accessing the network device by the terminal device without reducing a random access capacity of an entire system.

In an example embodiment, that the terminal device determines a time adjustment value based on the position of the terminal device and the position of the network device includes: The terminal device receives a first timing advance from the network device; and the terminal device determines the time adjustment value based on the position of the terminal device, the position of the network device, and the first timing advance. Alternatively, the terminal device determines the time adjustment value based on the position of the terminal device, the position of the network device, and a first receiving time, where the first receiving time is a time at which the network device expects to receive the random access preamble. Based on this solution, the network device may notify the first timing advance or the first receiving time, so that the terminal device may determine the time adjustment value based on the first timing advance or the first receiving time, to determine a time for sending the random access preamble.

In an example embodiment, the terminal device sends a MSG 3 to the network device based on a second receiving time, where the second receiving time is a time at which the network device expects to receive the MSG 3. Based on this solution, the network device may notify the second receiving time, so that the terminal device may determine, based on the second receiving time, time for sending the MSG 3.

In an example embodiment, the second receiving time is carried in a random access response for the random access preamble; the second receiving time is sent by the network device through broadcast; or the second receiving time is sent by the network device through control signaling.

In an example embodiment, the terminal device sends a MSG 3 to the network device based on a scheduling delay and an uplink grant, where the uplink grant and the scheduling delay are used to indicate a time domain position for sending the MSG 3. Alternatively, the terminal device sends a MSG 3 to the network device based on a scheduling delay, where the scheduling delay is used to indicate a time domain position for sending the MSG 3. Based on this solution, the network device may notify the scheduling delay, so that the terminal device may determine, based on the scheduling delay, time for sending the MSG 3. Alternatively, the network device may notify the scheduling delay and the uplink grant, so that the terminal device may determine, based on the scheduling delay and the uplink grant, time for sending the MSG 3.

In an example embodiment, the scheduling delay is carried in a random access response for the random access preamble; the scheduling delay is sent by the network device through broadcast; or the scheduling delay is sent by the network device through control signaling.

In an example embodiment, the terminal device sends the time adjustment value or an adjusted time adjustment value to the network device, where the adjusted time adjustment value is obtained by the terminal device by adjusting the time adjustment value based on a second timing advance sent by the network device.

In an example embodiment, the terminal device determines a time offset based on the position of the terminal device and the position of the network device. After the time offset from a time point at which the terminal device sends the random access preamble, the terminal device starts a time window for receiving a MSG 2.

According to a second aspect, this application provides a random access method. The method includes: A network device broadcasts a random access channel (RACH) resource. The network device receives a random access preamble from a terminal device, where the random access preamble is sent based on a selected RACH resource and a time adjustment value, and the time adjustment value is determined based on a position of the terminal device and a position of the network device. Based on this solution, the terminal device supports positioning. In this case, the terminal device may determine the time adjustment value based on the position of the terminal device and the position of the network device, and adjust, based on the time adjustment value, time for sending the random access preamble on the RACH resource. Therefore, the network device receives, at the same time, within a small time range, or within a short preamble receiving time window, random access preambles sent on a same RACH resource, and receives, at different times, within different small time ranges, or within different short preamble receiving time windows, random access preambles sent on different RACH resources, to help avoid a problem that random access preamble receiving time windows overlap, and increase a success rate of accessing the network device by the terminal device without reducing a random access capacity of an entire system.

In an example embodiment, the network device sends a first timing advance to the terminal device, where the first timing advance is used to determine the time adjustment value. Alternatively, the network device sends a first receiving time to the terminal device, where the first receiving time is a time at which the network device expects to receive the random access preamble, and the first receiving time is used to determine the time adjustment value. Based on this solution, the network device may notify the first timing advance or the first receiving time, so that the terminal device may determine the time adjustment value based on the first timing advance or the first receiving time, to determine a time for sending the random access preamble.

In an example embodiment, the network device sends a second receiving time to the terminal device, where the second receiving time is a time at which the network device expects to receive a MSG 3.

In an example embodiment, the network device sends a random access response for the random access preamble to the terminal device, where the random access response includes the second receiving time. Alternatively, the network device broadcasts the second receiving time to the terminal device. Alternatively, the network device sends control signaling to the terminal device, where the control signaling includes the second receiving time. Based on this solution, the network device may notify the second receiving time, so that the terminal device may determine, based on the second receiving time, the time for sending the MSG 3.

In an example embodiment, the network device sends a scheduling delay and an uplink grant to the terminal device, where the scheduling delay and the uplink grant are used to indicate a time domain position for sending a MSG 3. Alternatively, the network device sends a scheduling delay to the terminal device, where the scheduling delay is used to indicate a time domain position for sending a MSG 3. Based on this solution, the network device may notify the scheduling delay, so that the terminal device may determine, based on the scheduling delay, time for sending the MSG 3. Alternatively, the network device may notify the scheduling delay and the uplink grant, so that the terminal device may determine, based on the scheduling delay and the uplink grant, time for sending the MSG 3.

In an example embodiment, the network device sends a random access response for the random access preamble to the terminal device, where the random access response includes the scheduling delay. Alternatively, the network device broadcasts the scheduling delay to the terminal device. Alternatively, the network device sends control signaling to the terminal device, where the control signaling includes the scheduling delay.

In an example embodiment, the network device receives the time adjustment value from the terminal device. Alternatively, the network device sends a second timing advance to the terminal device, and the network device receives an adjusted time adjustment value from the terminal device, where the adjusted time adjustment value is obtained by the terminal device by adjusting the time adjustment value based on the second timing advance.

According to a third aspect, this application provides a random access apparatus. The apparatus may be a terminal device, or may be a chip used in the terminal device. The apparatus has a function of implementing various embodiments of the first aspect. The function may be implemented by hardware, or may be implemented by hardware executing corresponding software. The hardware or the software includes one or more modules corresponding to the function.

According to a fourth aspect, this application provides a random access apparatus. The apparatus may be a network device, or may be a chip used in the network device. The apparatus has a function of implementing various embodiments of the second aspect. The function may be implemented by hardware, or may be implemented by hardware executing corresponding software. The hardware or the software includes one or more modules corresponding to the function.

According to a fifth aspect, this application provides a random access apparatus, including a processor and a memory. The memory is configured to store computer-executable instructions. When the apparatus runs, the processor executes the computer-executable instructions stored in the memory, so that the apparatus performs the method in either of the foregoing aspects.

According to a sixth aspect, this application provides a random access apparatus, including a unit or a means configured to perform the steps in either of the foregoing aspects.

According to a seventh aspect, this application provides a random access apparatus, including a processor and an interface circuit. The processor is configured to: communicate with another apparatus through the interface circuit, and perform the method in either of the foregoing aspects. There are one or more processors.

According to an eighth aspect, this application provides a random access apparatus, including a processor, configured to: be connected to a memory and invoke a program stored in the memory, to perform the method in either of the foregoing aspects. The memory may be located inside the apparatus, or may be located outside the apparatus. In addition, there are one or more processors.

According to a ninth aspect, this application further provides a computer-readable storage medium. The computer-readable storage medium stores instructions. When the instructions are run on a computer, a processor is enabled to perform the method in either of the foregoing aspects.

According to a tenth aspect, this application further provides a computer program product including instructions. When the computer program product runs on a computer, the computer is enabled to perform the method in either of the foregoing aspects.

According to an eleventh aspect, this application further provides a chip system, including a processor, configured to perform the method in either of the foregoing aspects.

According to a twelfth aspect, this application further provides a communication system, including a terminal device configured to perform any method in the first aspect and a network device configured to perform any method in the second aspect.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more than two.

Figure 1:
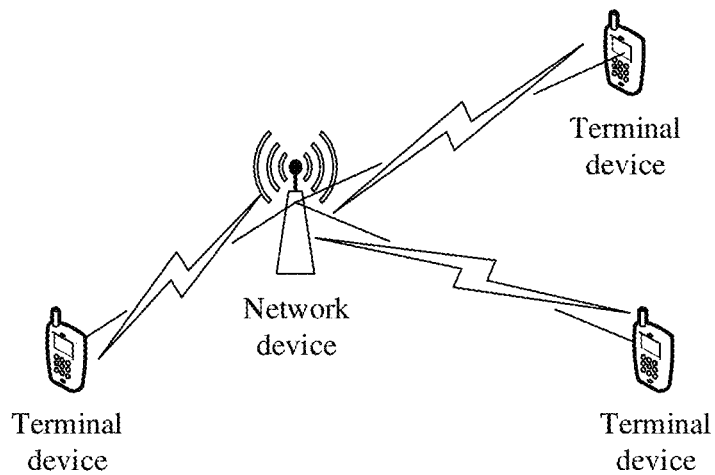
FIG. 1 is a schematic diagram of a possible network architecture according to an embodiment of this application.

FIG. 1 is a schematic diagram of an example network architecture to which this application is applicable. The network architecture includes a network device and at least one terminal device. The network device and the terminal device may operate in a new radio (NR) communication system, and the terminal device may communicate with the network device through the NR communication system. The network device and the terminal device may also operate in another communication system. This is not limited in embodiments of this application.

The terminal device (user equipment, UE) may be a wireless terminal device that can receive scheduling and indication information of the network device. The wireless terminal device may be a device that provides voice and/or data connectivity for a user, a handheld device having a wireless connection function, or another processing device connected to a wireless modem. The wireless terminal device may communicate with one or more core networks or the Internet through a radio access network, such as radio access network (RAN). The wireless terminal device may be a mobile terminal device, such as a mobile phone (which is also referred to as a "cellular" phone and a mobile phone), a computer, or a data card, for example, may be a portable, pocket-sized, handheld, computer built-in, or in-vehicle mobile apparatus that exchanges language and/or data with the radio access network. For example, the device may include a personal communications service (PCS) phone, a cordless phone, a session initiation protocol (SIP) phone, a wireless local loop (WLL) station, a personal digital assistant (PDA), a tablet computer (Pad), and a computer having a wireless transceiver function. The wireless terminal device may also be referred to as a system, a subscriber unit, a subscriber station, a mobile station (MS), a remote station, an access point (AP), a remote terminal device (remote terminal), an access terminal device (access terminal), a user terminal device (user terminal), a user agent, a subscriber station (SS), customer premises equipment (CPE), a terminal, user equipment (UE), a mobile terminal (MT), or the like. Alternatively, the wireless terminal device may be a wearable device and a next-generation communication system, for example, a terminal device in a 5G network, a terminal device in a future evolved public land mobile network (PLMN), a terminal device in an NR communication system, or the like.

The network device is an entity used to transmit or receive a signal on a network side, for example, a generation NodeB (gNodeB). The network device may be a device configured to communicate with a mobile device. The network device may be an AP in a wireless local area network (WLAN), a base transceiver station (BTS) in a global system for mobile communications (GSM) or code division multiple access (CDMA), a NodeB (NB) in wideband code division multiple access (WCDMA), an evolved NodeB (eNB or eNodeB) in long term evolution (LTE), a relay station, an access point, a vehicle-mounted device, a wearable device, a network device in a future 5G network, a network device in a future evolved public land mobile network (PLMN), a gNodeB in an NR system, or the like. In addition, in the embodiments of this application, the network device serves a cell, and the terminal device communicates with the network device by using a transmission resource (for example, a frequency domain resource, namely, a spectrum resource) used by the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells have characteristics of small coverage and low transmit power, and are applicable to providing a high-rate data transmission service. In addition, in another possible embodiment, the network device may be another apparatus that provides a wireless communication function for the terminal device. A specific technology and a specific device form that are used by the network device are not limited in the embodiments of this application. For ease of description, in the embodiments of this application, the apparatus that provides the wireless communication function for the terminal device is referred to as the network device.

To resolve the problem mentioned in the background, this application provides a solution. The solution is designed for a terminal device supporting positioning (that is, a terminal device having a positioning function). That the terminal device supports positioning means that the terminal device has a capability of performing positioning of the terminal device. For example, the terminal device has a global positioning system (GPS) positioning capability, and may obtain position information (for example, latitude and longitude information or cell information) of the terminal device through positioning. For another example, the terminal device has a BeiDou positioning capability, and may obtain position information (for example, latitude and longitude information or cell information) of the terminal device through positioning. For still another example, the terminal may obtain position information (for example, latitude and longitude information or cell information) of the terminal by using another positioning method.

In example embodiments of this application, the terminal device supporting positioning may use the position information of the terminal device through positioning and obtained position information of a network device (for example, the obtained position information may be notified by the network device or determined by the terminal device) to obtain a transmission delay between the terminal device and the network device through calculation, and then the terminal device may adjust a preamble sending time based on the transmission delay and time at which the network device expects to receive a preamble, or a given known timing advance. In this way, when different terminal devices that select a same RACH resource to send preambles send the preambles based on adjusted times, the network device may receive the preambles at the same time, within a small time range, or within a short preamble receiving time window. In addition, when there is a preamble receiving time window, preamble receiving time windows corresponding to different RACH resources still do not overlap even when RACH resources are densely configured in time domain.

Figure 2:
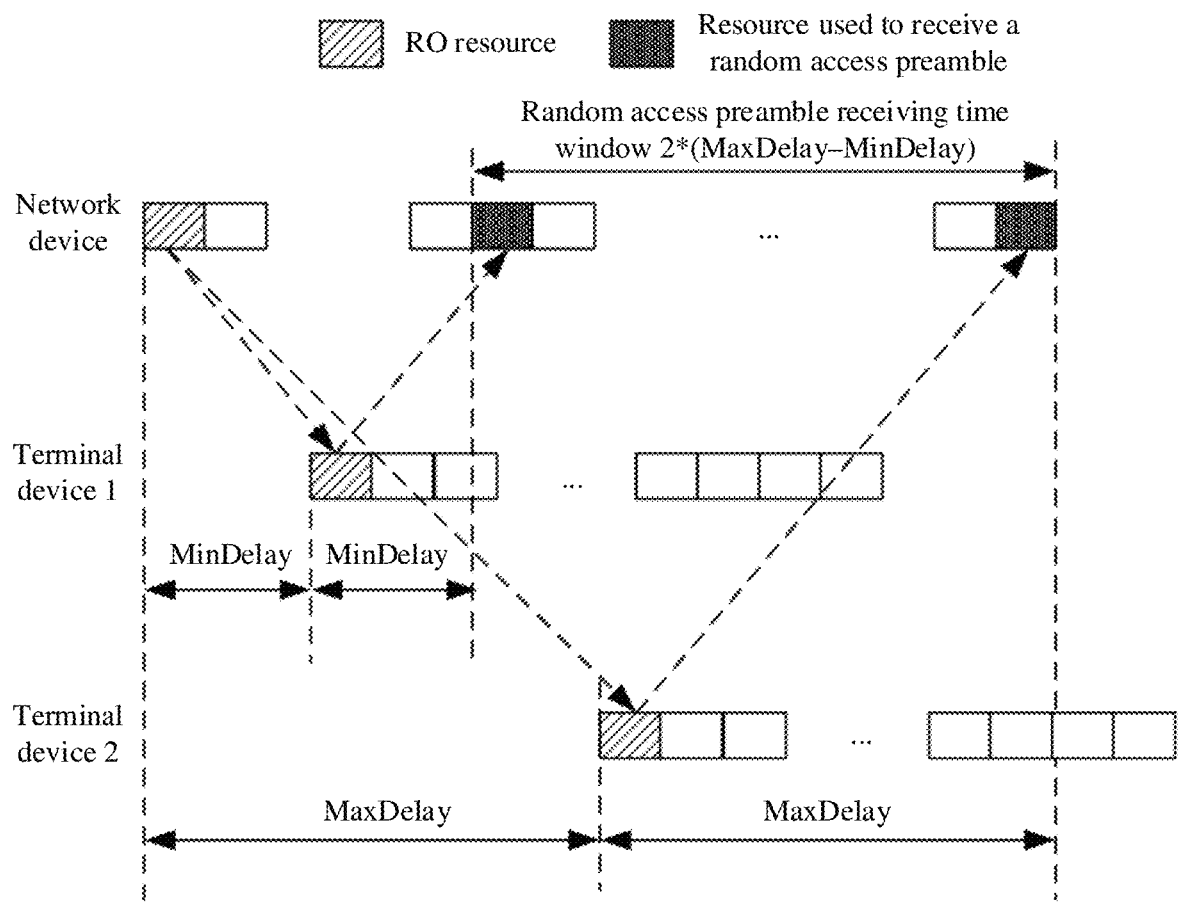
FIG. 2 is a schematic diagram of sending preambles by different terminal devices by using a same RO resource in a conventional technology.
Figure 4:
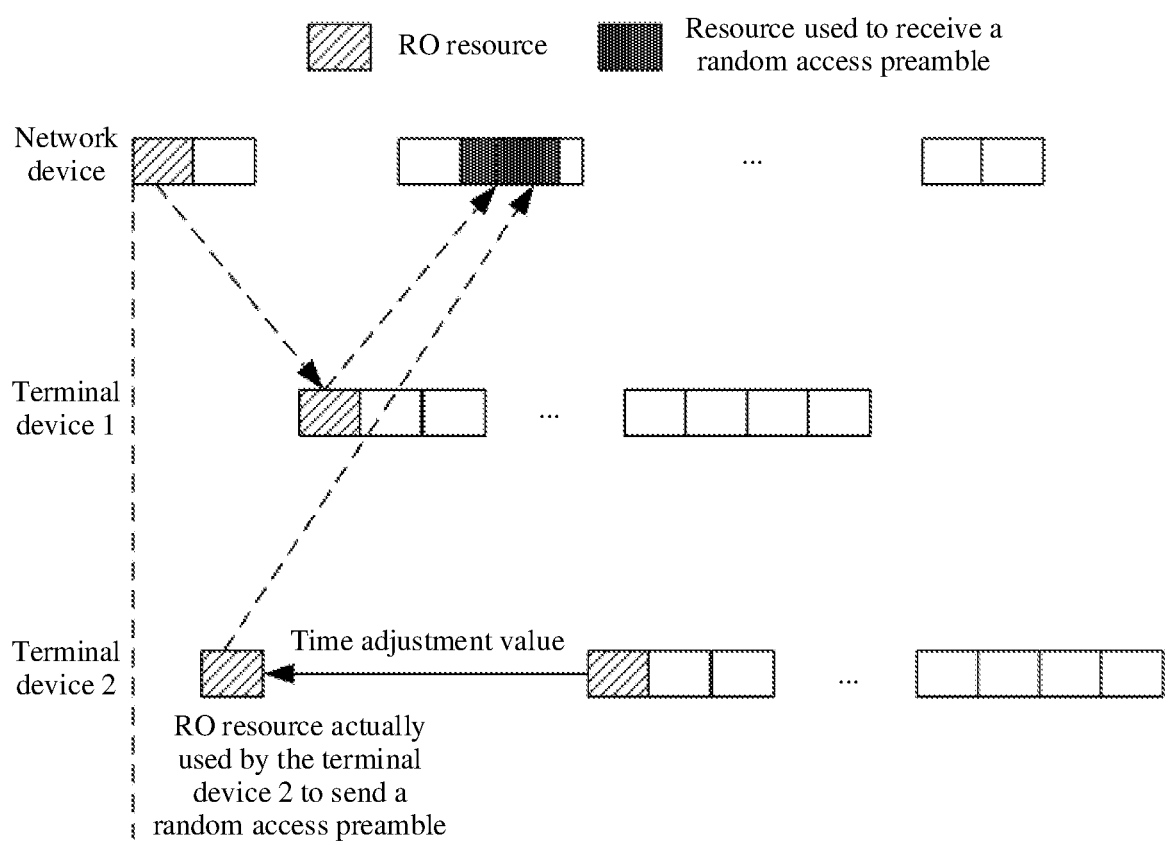
FIG. 4 is a schematic diagram of sending preambles by different terminal devices by using a same RO resource according to an embodiment of this application.

FIG. 4 is a schematic diagram of sending preambles by different terminal devices by using a same RO resource according to an embodiment of this application. FIG. 4 is an improvement on the preamble sending method shown in FIG. 2 based on FIG. 2.

Assuming that the terminal device 2 supports positioning, the terminal device 2 may determine position information of the terminal device 2 based on a positioning capability, and then determine a transmission delay between the terminal device 2 and the network device based on the position information of the terminal device 2 and position information of the network device, to further determine a time adjustment value. Then, the terminal device 2 adjusts a preamble sending time based on the time adjustment value and the preamble sending time indicated by a RACH resource, so that the terminal device 2 sends a preamble based on the adjusted time. Finally, the time at which the network device receives a preamble sent by the terminal device 1 is the same as or almost the same as the time at which the network device receives the preamble sent by the terminal device 2.

In an example embodiment, the terminal device may determine a constellation diagram or a running track diagram of positions of the network device, to learn of positions of the network device at different moments. Manners of determining the constellation diagram or the running track diagram of the positions of the network device include but are not limited to the following manners.

(1) The constellation diagram or the running track diagram of the positions of the network device is sent through broadcast of the network device.
(2) The constellation diagram or the running track diagram of the positions of the network device is preset in the terminal device.
(3) The network device broadcasts an indication or an index, and the terminal device determines, in a protocol or in a preset mapping table, the constellation diagram or the running track diagram of the positions of the network device based on the indication or the index.

Therefore, the terminal device may determine the transmission delay between the terminal device and the network device by using the following method: the terminal device determines a position of the terminal device based on the positioning information of the terminal device, determines a position of the network device based on the constellation diagram or the running track diagram of the positions of the network device, calculates a distance between the terminal device and the network device based on the position of the network device and the position of the terminal device, and further calculates the transmission delay between the terminal device and the network device.

It should be noted that when the network device serves a plurality of terminal devices supporting positioning, time adjustment values of the terminal devices are related to distances between the terminal devices and the network device. For terminal devices that have a same distance from the network device, a same time adjustment value is used, and for terminal devices that have different distances from the network device, different time adjustment values are used. Further, a terminal device that is farther from the network device usually indicates a larger time adjustment value of the terminal device. To be specific, a network device that is farther from the network device should send a preamble earlier. In this way, it is possible that the preamble sent by the terminal device and a preamble sent by a terminal device that is closer to the network device reach the network device at the same moment or almost the same moment and are received by the network device.

According to the foregoing method, the preamble receiving time window may be eliminated or the preamble receiving time window may be narrowed. For example, for a same RO resource, if a time at which the network device expects to receive a preamble is a moment (that is, a time point), terminal devices that are served by the network device and that send preambles by using the RO resource may respectively calculate respective time adjustment values, so that the preambles sent by the terminal devices are received by the network device at the same moment. Therefore, a size of the preamble receiving time window is 0, or it is understood as that there is no preamble receiving time window. For another example, for a same RO resource, if a time at which the network device expects to receive a preamble is a moment and a small error is allowed, or it is understood as that the time at which a preamble is expected to be received is an extremely small time range, terminal devices that are served by the network device and that send preambles by using the RO resource may respectively calculate respective time adjustment values, so that the preambles sent by the terminal devices are received by the network device within the extremely small time range, and the extremely small time range is an extremely short preamble receiving time window. However, a preamble receiving time window in a conventional technology is at least 2*(MaxDelay−MinDelay). To be specific, in the conventional technology, because each terminal device cannot adjust time for sending a preamble by the terminal device, time points at which the network device receives preambles sent by different terminal devices differ greatly, and a time interval from a time point at which the first preamble (usually sent by a closest terminal device) is received to a time point at which the last preamble (usually sent by a farthest terminal device) is received is 2*(MaxDelay−MinDelay). In this embodiment of this application, the terminal device having the positioning capability may adjust the time for sending the preamble by the terminal device, and the farther terminal device may send the preamble in advance. Therefore, time(s) at which the network device receives the preambles sent by the terminal devices may be the same moment, or may be within a small time range (that is, the extremely short preamble receiving time window). In embodiments of this application, the preamble receiving time window is narrowed to one small range or to one moment, so that times at which the network device receives different preambles do not overlap. Therefore, in these embodiments, a problem in the conventional technology that different preamble receiving time windows overlap is avoided without changing a RO resource periodicity.

Figure 3:
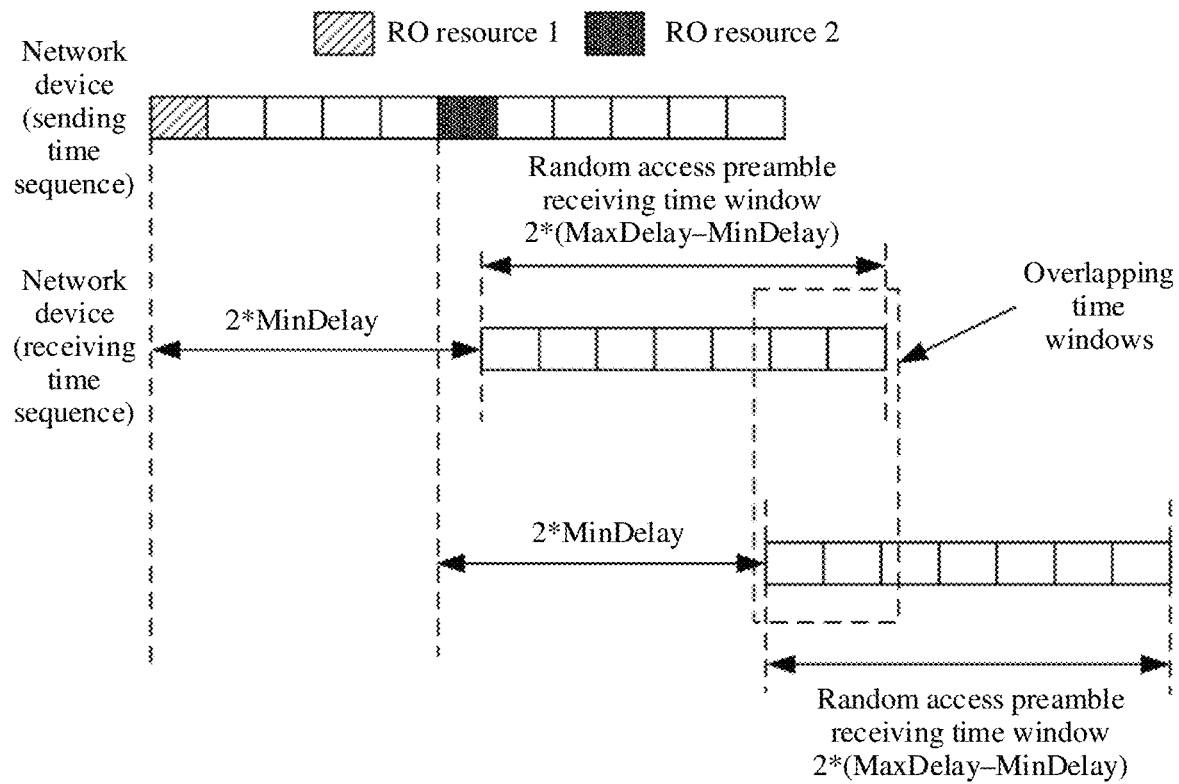
FIG. 3 is a schematic diagram of sending preambles by different terminal devices by using different RO resources in a conventional technology.

Therefore, when different terminal devices supporting positioning send preambles by using different RO resources, sending time may be adjusted to eliminate the preamble receiving time window or narrow the preamble receiving time window, so that a problem that preamble receiving time windows respectively corresponding to the different RO resources overlap can be avoided. In other words, for different terminal devices having the positioning capability, a problem shown in FIG. 3 that preamble receiving time windows overlap does not occur.

The following provides different example methods used by the terminal device to determine the time adjustment value.

In the following methods, X represents the time adjustment value, and T1 represents the transmission delay between the terminal device and the network device, where T1=distance between the terminal device and the network device/speed of light. T1 herein may also be referred to as a timing advance (TA).

Implementation method 1: The terminal device determines the time adjustment value based on a position of the terminal device and a position of the network device, for example, X=T1.

It should be noted that specific values of T1 corresponding to different terminal devices may be the same or may be different, and a specific value of T1 is related to a distance between the terminal device and the network device.

Implementation method 2: The terminal device determines the time adjustment value based on a position of the terminal device, a position of the network device, and a first timing advance (represented by T2), for example, X=T1−T2.

T2 herein may be a cell-level reference time value, or may be a transmission delay between a specific terminal device and the network device, or may be a transmission delay between a position (where there is no terminal device at the position) and the network device. The value T2 may be sent by the network device through broadcast, or may be determined by the terminal device with reference to a broadcast indication of the network device and a protocol specification.

It should be noted that if T1−T2 is a positive value, it indicates that sending time is advanced; if T1−T2 is a negative value, it indicates that sending time is delayed.

The value T2 is the same for different terminal devices.

Implementation method 3: The terminal device determines the time adjustment value based on a position of the terminal device, a position of the network device, and a first receiving time. The first receiving time (represented by T3) may be a time at which the network device expects to receive a random access preamble, for example, X=|2T1−T3|.

| herein means taking an absolute value.

T3 herein may be a duration during which the network device expects to receive, by using a RO resource as reference time, a preamble sent on the RO resource, or it is understood as that from the network device considers that a preamble sent on a RO resource is received by the network device after a duration T3. The value T3 may be sent by the network device through broadcast, or may be determined by the terminal device with reference to a broadcast indication of the network device and a protocol specification. It should be noted that the first receiving time herein may be a relative time described above, or may be an absolute time. This is not limited in embodiments of this application.

Figure 5:
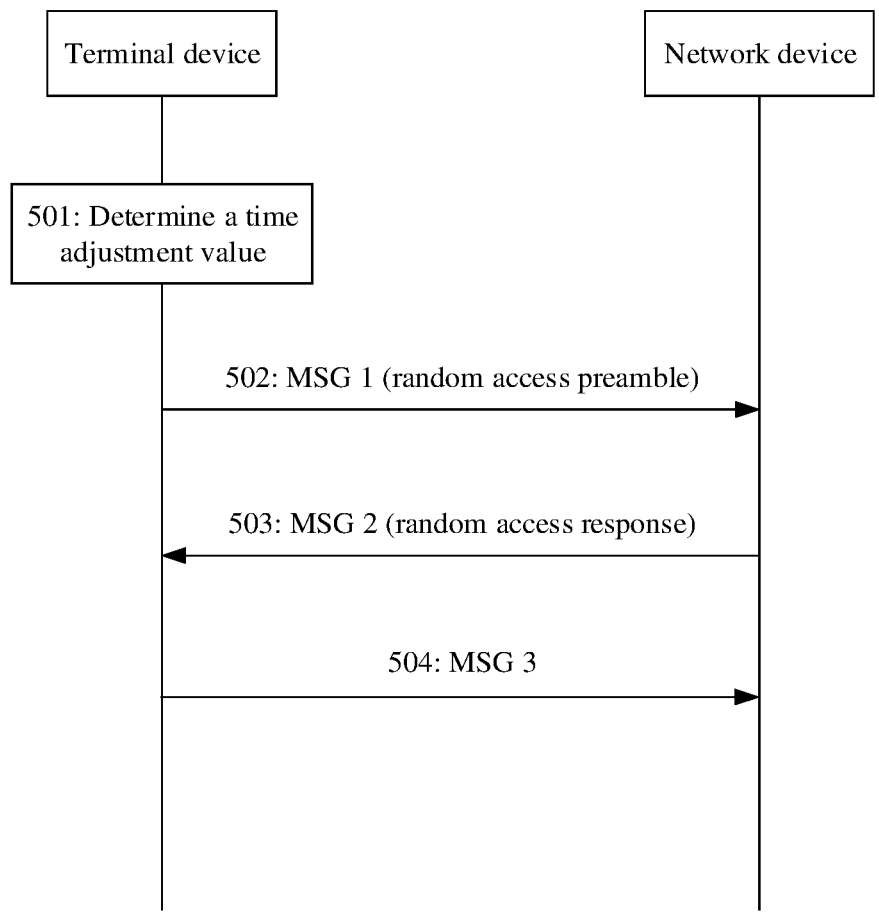
FIG. 5 is a schematic flowchart of a random access method according to an embodiment of this application.

The following describes the foregoing solutions provided in this application with reference to the accompanying drawings. Based on the architecture shown in FIG. 1, as shown in FIG. 5, this application provides a random access method. The method may be used to resolve the foregoing problem.

The method includes the following steps.

Step 501: A terminal device determines a time adjustment value.

An example embodiment in which the terminal device determines the time adjustment value is described above, and details are not described herein again.

Step 502: The terminal device sends a MSG 1 based on the time adjustment value and a RACH resource configured by a network device, where the MSG 1 includes a preamble.

Specifically, before sending the MSG 1, the terminal device selects the RACH resource, adjusts an actual sending time based on the time adjustment value in step 501 and a time domain position indicated by the RACH resource, to obtain an adjusted preamble sending time, and then sends the MSG 1 based on the adjusted preamble sending time.

Based on step 501 and step 502, the sending time is adjusted, so that preambles sent by terminal devices, at different positions in a cell, that select a same RO resource can reach the network device at a same moment expected by the network device or within a time range expected by the network device. This helps avoid a problem that preamble receiving time windows overlap in a conventional technology.

After step 502, the following step 503 and step 504 may be further performed.

Step 503: The network device sends a MSG 2 to the terminal device, where the MSG 2 carries a random access response (RAR).

The RAR carries scheduling information of a MSG 3.

Step 504: The terminal device sends the MSG 3 to the network device.

Before sending the MSG 1, the terminal device adjusts the sending time based on estimation of the terminal device. Consequently, the network device cannot estimate an actual transmission delay from the terminal device to the network device. Because the scheduling information of the MSG 3 is delivered in the RAR of the MSG 2, the network device does not learn of a transmission delay of the terminal device, and the following problem is caused to the scheduling of the MSG 3:

Currently, an uplink grant carried in the RAR indicates a frequency domain position and a time domain position for sending the MSG 3 of the terminal device, so that the terminal device learns of specific time for sending the MSG 3 and the network device learns of specific time for receiving the MSG 3. However, the network device can learn of the time for receiving the MSG 3 only when the network device learns of the transmission delay.

Figure 6:
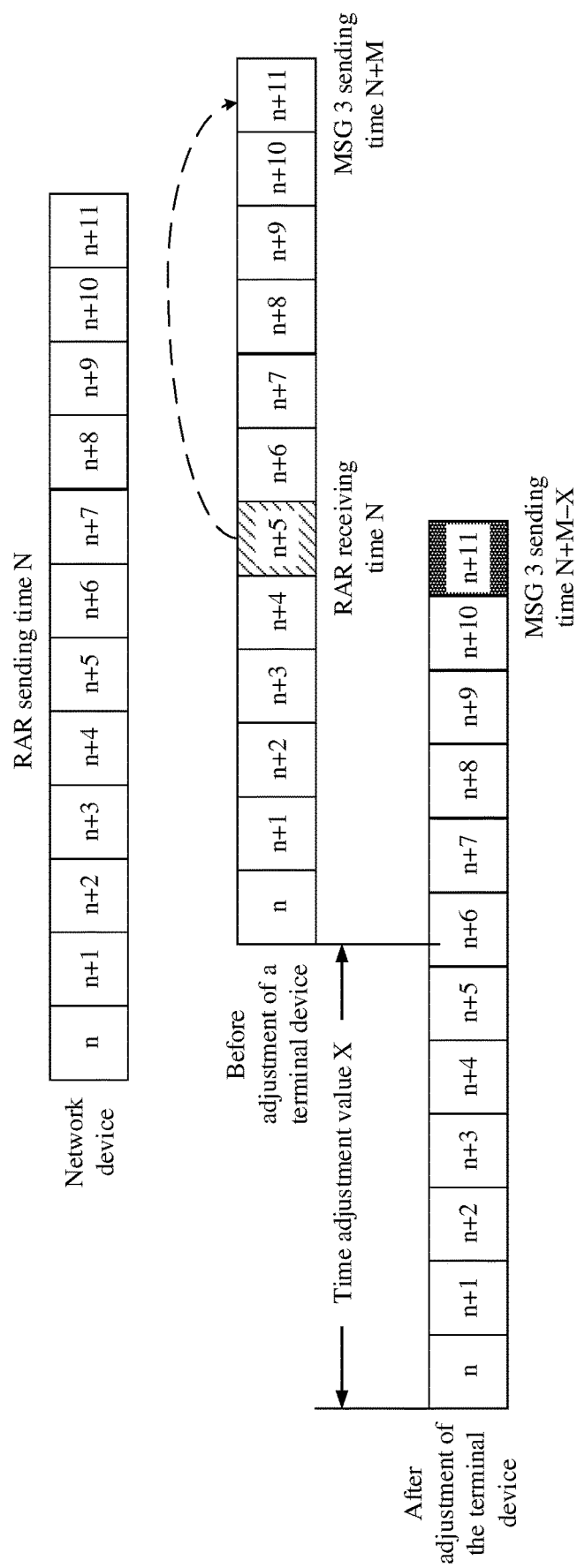
FIG. 6 is an example diagram of sending a MSG 3 according to an embodiment of this application.

The following describes the foregoing problem with reference to an example. FIG. 6 shows an example diagram of sending a MSG 3. Assuming that the network device sends the RAR in a subframe or a slot N (N=n+5 is used as an example in the figure), and a subframe or a slot, indicated in the RAR, in which the terminal device sends the MSG 3 is N+M (N+M=n+11 is used as an example in the figure, that is, M=6, where M herein is a time domain position indicated in the uplink grant), a subframe or a slot in which the terminal device receives the RAR is N. Assuming that the terminal device adjusts, based on the time adjustment value of the MSG 1 (that is, the time adjustment value determined in step 501), time for sending the MSG 3, the time adjustment value X may be greater than M. In this case, the terminal device may have missed a sending moment of the MSG 3 after adjusting the sending time, or it is understood as that the terminal device should actually first receive the RAR, obtain, based on the uplink grant in the RAR, a time-frequency resource for sending the MSG 3, and then send the MSG 3 based on the time-frequency resource. However, according to the foregoing embodiment of this application, after time for sending the MSG 1 is adjusted, time for sending the MSG 3 may be earlier than time for receiving the RAR. This is clearly improper. In addition, after receiving the RAR, the terminal device further needs specific processing time to send the MSG 3, making this problem severer. For example, in FIG. 6, before adjusting the time for sending the MSG 1, the terminal device receives the RAR at a position n+5. After the time for sending the MSG 1 is adjusted based on the time adjustment value, the time for sending the MSG 3 is also advanced, and the time for sending the MSG 3 is at a position n+11. It can be learned from the figure that the time domain position (the position n+11) for sending the MSG 3 after the time for sending the MSG 1 is adjusted is earlier than a time domain position (the position n+5) for receiving the RAR before the time for sending the MSG 1 is adjusted. In other words, the terminal device needs to send the MSG 3 before receiving the RAR. This is improper because in normal cases, it is required to first receive the RAR and then send the MSG 3 based on scheduling of the RAR. Therefore, if the time for sending the MSG 1 is adjusted directly based on the time adjustment value of the MSG 1 (that is, the time adjustment value in step 501) and the time for sending the MSG 3 is not adjusted, the MSG 3 may not be sent.

To resolve the foregoing problem, an embodiment of this application provides different solutions, that is, in step 504, the MSG 3 may be sent according to the following method.

Solution 1: The network device sends a scheduling delay and an uplink grant to the terminal device, where the uplink grant is used to indicate a time domain position and a frequency domain position for sending the MSG 3, and the scheduling delay (represented by P) is used to indicate to adjust the time domain position, indicated by the uplink grant, of the MSG 3.

Alternatively, it is understood as that, in this method, the uplink grant and the scheduling delay are combined to indicate a time domain position for sending the MSG 3.

According to the implementation, the terminal device determines that the actual time for sending the MSG 3 is N+M−X+P, where N is a subframe or a slot in which the terminal device receives the RAR, X is the time adjustment value of the MSG 1 in step 501, P is the scheduling delay, and M is the time domain position, indicated by the uplink grant, for sending the MSG 3.

Figure 7:
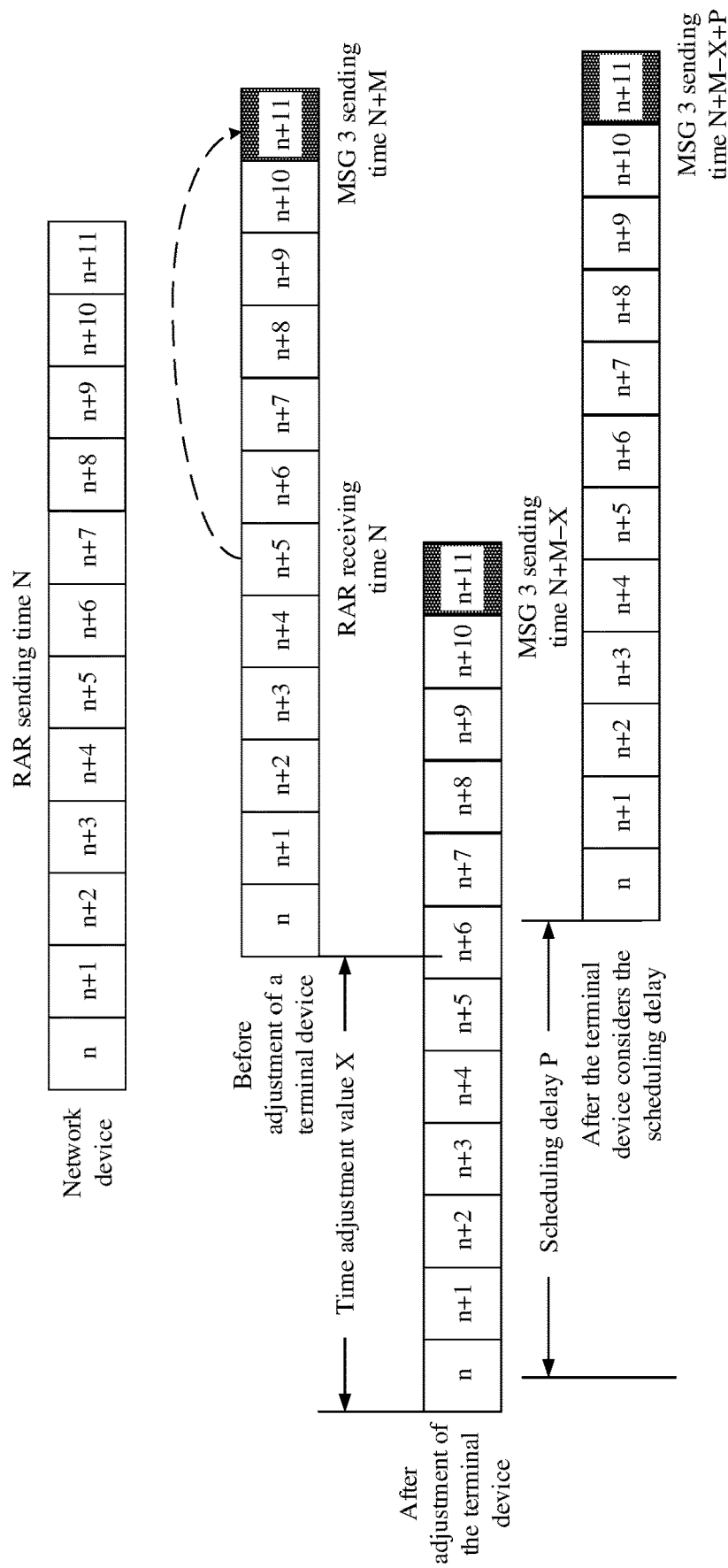
FIG. 7 is another example diagram of sending a MSG 3 according to an embodiment of this application.

FIG. 7 shows another example of sending a MSG 3. In this example, for the problem in FIG. 6, the time for sending the MSG 3 is obtained by using the foregoing solution 1. In this example, actual time for sending the MSG 3 by the terminal device is N+M−X+P. It can be learned from the figure that the terminal device considers that the actual time (that is, a position n+11) for sending the MSG 3, after the scheduling delay P, is later than the time N for receiving the RAR (that is, a position n+5 used before adjustment of the terminal device in the figure), so that the MSG 3 can be correctly sent. The terminal device can also correctly receive the uplink grant.

Solution 2: The network device sends a scheduling delay to the terminal device. In this case, an uplink grant may not need to be sent, or an uplink grant may still be sent but the uplink grant is used to indicate only a frequency domain position for sending the MSG 3. The scheduling delay (represented by Q) has covered a time domain position indicated in the uplink grant, and then the terminal device determines that actual time for sending the MSG 3 is N−X+Q, where N is a subframe or a slot in which the terminal device receives the RAR, X is the time adjustment value of the MSG 1 in step 501, and Q is the scheduling delay. It may be understood as that Q=P+M, P is the scheduling delay in the solution 1, and M is the time domain position, indicated in the uplink grant in the solution 1, for sending the MSG 3.

For the solution 1 or the solution 2, the scheduling delay sent by the network device may be sent through broadcast, carried in the RAR for sending, sent together with the RAR in the MSG 2, or sent through control signaling of a control channel. For the solution 1, the uplink grant sent by the network device may be sent through broadcast, carried in the RAR for sending, sent together with the RAR in the MSG 2, or sent through control signaling of a control channel.

In another example embodiment, a plurality of scheduling delays may alternatively be preconfigured on the terminal device, and each scheduling delay corresponds to one piece of indication information. Therefore, when the network device needs to send a scheduling delay to the terminal device, a scheduling delay indication needs to be sent to the terminal device only by using the RAR, the control signaling, or the MSG 2, so that the terminal device may determine a corresponding scheduling delay based on the received scheduling delay indication. Because overheads of the scheduling delay indication are small, air interface overheads can be reduced.

In another example embodiment, the network device may alternatively send a plurality of scheduling delays and indication information corresponding to each scheduling delay to the terminal device in advance. Therefore, when the network device needs to send a scheduling delay to the terminal device subsequently, a scheduling delay indication needs to be sent to the terminal device only by using the RAR, the control signaling, or the MSG 2, so that the terminal device may determine a corresponding scheduling delay based on the received scheduling delay indication. Because overheads of the scheduling delay indication are small, air interface overheads can be reduced.

A duration of the scheduling delay may be determined based on an adjustment value of a terminal device farthest in a cell. Optionally, when determining the scheduling delay, the network device further needs to consider processing time of the terminal device (for example, processing time for the MSG 2). After the terminal device adjusts the time for sending the MSG 3, the network device may learn of, based on a relative time relationship between the time for receiving the MSG 1 and the time of a RO resource, the time for receiving the MSG 3.

Solution 3: The network device sends a second receiving time to the terminal device, where the second receiving time is a time at which the network device expects to receive the MSG 3, and the terminal device sends the MSG 3 to the network device based on the second receiving time.

Refer to FIG. 6. Assuming that the network device sends the RAR in the subframe or the slot N, and the subframe or the slot, indicated in the RAR, in which the terminal device sends the MSG 3 is N+M, the subframe or the slot in which the terminal device receives the RAR is N. Assuming that the terminal device does not adjust the time for sending the MSG 3, that is, the terminal device sends the MSG 3 in the subframe or the slot N+M, the time for sending the MSG 3 by the terminal device does not have a problem, but the network device cannot determine a time for receiving the MSG 3. As a result, the network device cannot receive the MSG 3. This is because the network device does not learn of a transmission delay of the terminal device, that is, the network device does not learn of a position used before adjustment of the terminal device.

Therefore, in the solution 3, the network device indicates the second receiving time (represented by T) to the terminal device, and the value T is a moment at which the network device expects to receive a corresponding MSG 3 by using a RAR sending moment as a reference moment. In other words, after a duration T from a time point at which the RAR is sent, the network device considers that the corresponding MSG 3 is received by the network device. Alternatively, in another example embodiment, the second receiving time may be an absolute time length. T may be broadcast by the network device, carried in the RAR, sent through control signaling of a control channel, or inferred by the terminal device based on an indication of the network device and a protocol specification. In this way, after receiving the RAR, the terminal device determines, based on the transmission delay learned of by the terminal device and the value T, the time for sending the MSG 3, to ensure that the network device can receive the MSG 3 at a required moment.

In addition, the RAR in step 503 may further carry a second timing advance (represented by T4), and the value T4 may be used by the terminal device to subsequently more precisely adjust the time adjustment value calculated in step 501. In an implementation, the adjusted time adjustment value=the time adjustment value+T4, where T4 may be a positive value or a negative value based on an actual situation.

Further, after sending the MSG 1, the terminal device needs to learn of time for receiving the RAR. The terminal device starts a RAR receiving time window at a time domain position at which the RAR may be received, and receives the RAR within the RAR receiving time window. A starting manner may be that after a time offset from a time point at which the MSG 1 is sent, the terminal device starts the RAR receiving time window. For example, after the time for sending the MSG 1 is adjusted, the offset may be set to 2*T1, and T1 herein is the foregoing transmission delay between the terminal device and the network device. The earliest time at which the terminal device may receive the RAR should be that the MSG 1 reaches the network device after T1 and the RAR sent by the network device reaches the terminal device after T1. Therefore, the offset may be set to 2*T1. Alternatively, it is understood as that the terminal device starts the RAR receiving time window at a moment of 2*T1 after the preamble is sent.

Finally, for subsequent scheduling optimization, the network device needs to learn of an actual transmission delay of the terminal device. Therefore, the terminal device may report the time adjustment value X in step 501 in the MSG 3, a MSG 5, or another message (for example, when X=T1, T1 is reported; for another example, when X=T1−T2, T1−T2 may be reported; for still another example, when X=|2T1−T3|, |2T1−T3| may be reported). Then, the network device determines the actual transmission delay of the terminal device based on the time adjustment value. Alternatively, the terminal device may report the adjusted time adjustment value in the MSG 3 or a MSG 5 (that is, adjusted time adjustment value=time adjustment value+T4), so that the network device determines the actual transmission delay of the terminal device based on the adjusted time adjustment value.

According to the foregoing solution, for the terminal device having a positioning function, the time adjustment value may be calculated in advance, to ensure that a RACH can be successfully performed, and overcome a preamble receiving time window overlap problem caused by a large delay without reducing a RACH capacity. In addition, a sending time may be adjusted before the MSG 1 and the MSG 3 are sent. The network device may further indicate the scheduling delay, and the terminal device may further report the time adjustment value or the transmission delay.

In addition, in the foregoing embodiment, the solutions are mainly directed to an existing four-step random access procedure. Currently, to reduce a random access delay in some scenarios, a two-step random access method is also being studied. In a four-step random access procedure, the terminal device sends a MSG 1, receives a MSG 2, then sends a MSG 3, and finally receives a MSG 4. However, in a two-step random access procedure, the terminal device sends a MSG A, where the MSG A may be considered as a combination of the MSG 1 and the MSG 3 in the four-step random access procedure; and then the terminal device receives a MSG B, where the MSG B may be considered as a combination of the MSG 2 and the MSG 4. Content of the MSG A is not limited to being the same as that of the MSG 1+MSG 3, but is intended to indicate that functions of the MSG A and the MSG 1+MSG 3 are the same. The MSG B is similar to the MSG A. In addition, names of the MSG A and the MSG B are not limited.

In a two-step random access procedure, the method in the foregoing embodiment is also applicable. Before sending the MSG A, the terminal device may adjust a time for sending the MSG A according to the method for adjusting the MSG 1 in the foregoing embodiment, so that the network device can identify a RO resource for sending the MSG A when receiving all or a part of MSGs A. In addition, the MSG B may carry a second timing advance to adjust a time adjustment value. In addition, before a MSG B receiving window is started, an offset may also be added by using a method similar to that for setting the offset when the MSG 2 is received. Then, after a time offset from a time point at which the terminal device sends the MSG A, the terminal device starts the MSG B receiving time window. Alternatively, it is understood as that the terminal device starts the MSG B receiving time window at a moment of the offset after the MSG A is sent. Finally, the terminal device may further report the time adjustment value or an adjusted time adjustment value to the network device through an uplink message.

The solutions provided in this application are described above mainly from a perspective of interaction between the network elements. It may be understood that to implement the foregoing functions, each network element includes a corresponding hardware structure and/or software module for implementing each function. A person skilled in the art should easily be aware that, in combination with units and algorithm steps of examples described in the embodiments disclosed in this specification, the present invention may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the present invention.

Figure 8:
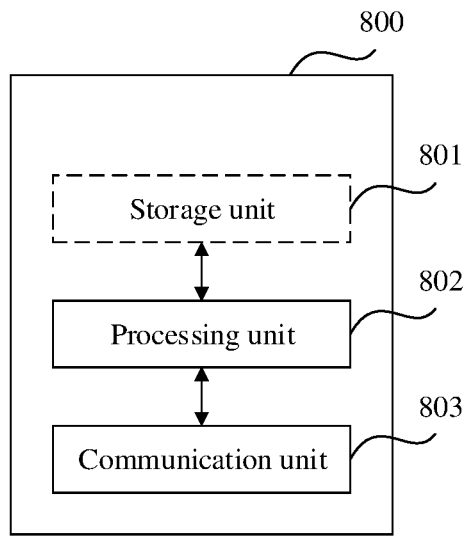
FIG. 8 is a schematic diagram of a random access apparatus according to an embodiment of this application.

FIG. 8 is a possible example block diagram of a random access apparatus according to an embodiment of this application, and the apparatus 800 may exist in a form of software or hardware. The apparatus 800 may include a processing unit 802 and a communication unit 803. In an implementation, the communication unit 803 may include a receiving unit and a sending unit. The processing unit 802 is configured to control and manage an action of the apparatus 800. The communication unit 803 is configured to support the apparatus 800 in communicating with another network entity. The apparatus 800 may further include a storage unit 801, configured to store program code and data of the apparatus 800.

The processing unit 802 may be a processor or a controller, for example, a general-purpose central processing unit (CPU), a general-purpose processor, digital signal processor (DSP), an application specific integrated circuit (ASIC), a field programmable gate array (FPGA), another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination including one or more microprocessors, or a combination of a DSP and a microprocessor. The storage unit 801 may be a memory. The communication unit 803 is an interface circuit of the apparatus, and is configured to receive a signal from another apparatus. For example, when the apparatus is implemented in a form of a chip, the communication unit 803 is an interface circuit used by the chip to receive a signal from another chip or apparatus, or is an interface circuit used by the chip to send a signal to another chip or apparatus.

The apparatus 800 may be the terminal device in any one of the foregoing embodiments, or may be a chip used in the terminal device. For example, when the apparatus 800 is the terminal device, the processing unit 802 may be, for example, a processor, and the communication unit 803 may be, for example, a transceiver. Optionally, the transceiver may include a radio frequency circuit, and the storage unit may be, for example, a memory. For example, when the apparatus 800 is the chip used in the terminal device, the processing unit 802 may be, for example, a processor, and the communication unit 803 may be, for example, an input/output interface, a pin, or a circuit. The processing unit 802 may execute computer-executable instructions stored in the storage unit. Optionally, the storage unit is a storage unit inside the chip, such as a register or a cache. Alternatively, the storage unit may be a storage unit that is inside the terminal device and that is located outside the chip, such as a read-only memory (ROM), another type of static storage device that can store static information and instructions, or a random access memory (RAM).

In an embodiment, the processing unit 802 is configured to: obtain a position of the terminal device and a position of a network device, determine a time adjustment value based on the position of the terminal device and the position of the network device. The communication unit 803 is configured to send a random access preamble based on the time adjustment value and a random access channel (RACH) resource configured by the network device.

In an example embodiment, the processing unit 802 is specifically configured to: receive a first timing advance from the network device, determine the time adjustment value based on the position of the terminal device, the position of the network device, and the first timing advance, and determine the time adjustment value based on the position of the terminal device, the position of the network device, and a first receiving time, where the first receiving time is a time at which the network device expects to receive the random access preamble.

In an example embodiment, the communication unit 803 is further configured to send a MSG 3 to the network device based on a second receiving time, where the second receiving time is a time at which the network device expects to receive the MSG 3.

In an example embodiment, the second receiving time is carried in a random access response for the random access preamble; the second receiving time is sent by the network device through broadcast; or the second receiving time is sent by the network device through control signaling.

In an example embodiment, the communication unit 803 is further configured to send a MSG 3 to the network device based on a scheduling delay and an uplink grant, where the uplink grant and the scheduling delay are used to indicate a time domain position for sending the MSG 3; or send a MSG 3 to the network device based on a scheduling delay, where the scheduling delay is used to indicate a time domain position for sending the MSG 3.

In an example embodiment, the scheduling delay is carried in a random access response for the random access preamble; the scheduling delay is sent by the network device through broadcast; or the scheduling delay is sent by the network device through control signaling.

In an example embodiment, the communication unit 803 is further configured to send a time adjustment value or an adjusted time adjustment value to the network device, where the adjusted time adjustment value is obtained by the terminal device by adjusting the time adjustment value based on a second timing advance sent by the network device.

In an example embodiment, the processing unit 802 is further configured to: determine a time offset based on the position of the terminal device and the position of the network device, and after the time offset from a time point at which the random access preamble is sent, start a time window for receiving a MSG 2.

It may be understood that, for a specific implementation process and a corresponding beneficial effect of the apparatus when the random access apparatus is used for the random access method, refer to related descriptions in the foregoing method embodiments. Details are not described herein again.

Figure 9:
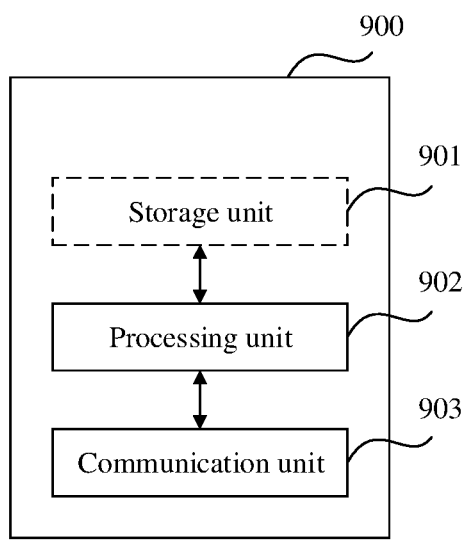
FIG. 9 is a schematic diagram of a random access apparatus according to an embodiment of this application.

FIG. 9 is a possible example block diagram of a random access apparatus in this application, and the apparatus 900 may exist in a form of software or hardware. The apparatus 900 may include a processing unit 902 and a communication unit 903. In an implementation, the communication unit 903 may include a receiving unit and a sending unit. The processing unit 902 is configured to control and manage an action of the apparatus 900. The communication unit 903 is configured to support the apparatus 900 in communicating with another network entity. The apparatus 900 may further include a storage unit 901, configured to store program code and data of the apparatus 900.

The processing unit 902 may be a processor or a controller, for example, a CPU, a general-purpose processor, a DSP, an ASIC, an FPGA, or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination including one or more microprocessors, or a combination of a DSP and a microprocessor. The storage unit 901 may be a memory. The communication unit 903 is an interface circuit of the apparatus, and is configured to receive a signal from another apparatus. For example, when the apparatus is implemented in a form of a chip, the communication unit 903 is an interface circuit used by the chip to receive a signal from another chip or apparatus, or is an interface circuit used by the chip to send a signal to another chip or apparatus.

The apparatus 900 may be the network device in any one of the foregoing embodiments, or may be a chip used in the network device. For example, when the apparatus 900 is the network device, the processing unit 902 may be, for example, a processor, and the communication unit 903 may be, for example, a transceiver. Optionally, the transceiver may include a radio frequency circuit, and the storage unit may be, for example, a memory. For example, when the apparatus 900 is the chip used in the network device, the processing unit 902 may be, for example, a processor, and the communication unit 903 may be, for example, an input/output interface, a pin, or a circuit. The processing unit 902 may execute computer-executable instructions stored in the storage unit. Optionally, the storage unit is a storage unit inside the chip, such as a register or a cache. Alternatively, the storage unit may be a storage unit that is inside the network device and that is located outside the chip, such as a ROM, another type of static storage device that can store static information and instructions, or a RAM.

In an embodiment, the communication unit 903 is configured to broadcast a random access channel (RACH) resource. The communication unit 903 is further configured to receive a random access preamble from a terminal device, where the random access preamble is sent based on a selected RACH resource and a time adjustment value, and the time adjustment value is determined based on a position of the terminal device and a position of the network device.

In an example embodiment, the communication unit 903 is further configured to send a first timing advance to the terminal device, where the first timing advance is used to determine the time adjustment value; or send a first receiving time to the terminal device, where the first receiving time is a time at which the network device expects to receive the random access preamble, and the first receiving time is used to determine the time adjustment value.

In an example embodiment, the communication unit 903 is further configured to send a second receiving time to the terminal device, where the second receiving time is a time at which the network device expects to receive a MSG 3.

In an example embodiment, the communication unit 903 is further configured to send a random access response for the random access preamble to the terminal device, where the random access response includes the second receiving time; broadcast the second receiving time to the terminal device; or send control signaling to the terminal device, where the control signaling includes the second receiving time.

In an example embodiment, the communication unit 903 is further configured to send a scheduling delay and an uplink grant to the terminal device, where the scheduling delay and the uplink grant are used to indicate a time domain position for sending a MSG 3; or send a scheduling delay to the terminal device, where the scheduling delay is used to indicate a time domain position for sending a MSG 3.

In an example embodiment, the communication unit 903 is further configured to send a random access response for the random access preamble to the terminal device, where the random access response includes the scheduling delay; broadcast the scheduling delay to the terminal device; or send control signaling to the terminal device, where the control signaling includes the scheduling delay.

In an example embodiment, the communication unit 903 is further configured to receive the time adjustment value from the terminal device; or send a second timing advance to the terminal device, and receive an adjusted time adjustment value from the terminal device, where the adjusted time adjustment value is obtained by the terminal device by adjusting the time adjustment value based on the second timing advance.

It may be understood that, for a specific implementation process and a corresponding beneficial effect of the apparatus when the random access apparatus is used for the random access method, refer to related descriptions in the foregoing method embodiments. Details are not described herein again.

Figure 10:
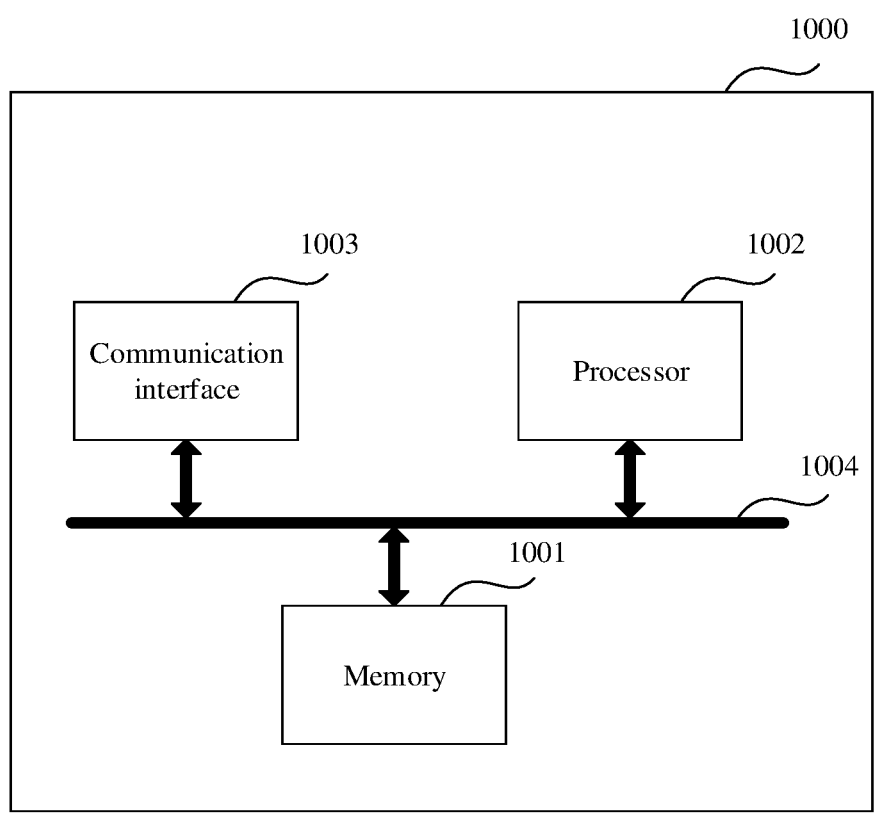
FIG. 10 is a schematic diagram of a random access apparatus according to an embodiment of this application.

FIG. 10 is a schematic diagram of a random access apparatus according to an embodiment of this application. The apparatus may be the terminal device or the network device in the foregoing embodiments. The apparatus 1000 includes a processor 1002, a communication interface 1003, and a memory 1001. Optionally, the apparatus 1000 may further include a communication line 1004. The communication interface 1003, the processor 1002, and the memory 1001 may be connected to each other through the communication line 1004. The communication line 1004 may be a peripheral component interconnect (PCI for short) bus, an extended industry standard architecture (EISA for short) bus, or the like. The communication line 1004 may be classified into an address bus, a data bus, a control bus, and the like. For ease of representation, only one bold line is used to represent the bus in FIG. 10, but this does not mean that there is only one bus or only one type of bus.

The processor 1002 may be a CPU, a microprocessor, an ASIC, or one or more integrated circuits configured to control program execution in the solutions of this application.

The communication interface 1003 uses any apparatus like a transceiver, and is configured to communicate with another device or a communication network, such as the Ethernet, a radio access network (RAN), a wireless local area network (WLAN), or a wired access network.

The memory 1001 may be a ROM or another type of static storage device that can store static information and instructions, or a RAM or another type of dynamic storage device that can store information and instructions, or may be an electrically erasable programmable read-only memory (EEPROM), a compact disc read-only memory (CD-ROM) or another optical disc storage, an optical disc storage (including a compact disc, a laser disc, an optical disc, a digital versatile disc, a Blu-ray disc, and the like), a magnetic disk storage medium or another magnetic storage device, or any other medium that can carry or store expected program code in a form of an instruction structure or a data structure and can be accessed by a computer, but is not limited thereto. The memory may exist independently, and is connected to the processor through the communication line 1004. The memory may alternatively be integrated with the processor.

The memory 1001 is configured to store computer-executable instructions for executing the solutions of this application, and the processor 1002 controls the execution. The processor 1002 is configured to execute the computer-executable instructions stored in the memory 1001, to implement the random access method provided in the foregoing embodiments of this application.

Optionally, the computer-executable instructions in this embodiment of this application may also be referred to as application program code. This is not specifically limited in embodiments of this application.

A person of ordinary skill in the art may understand that first, second, and various reference numerals in this application are merely used for differentiation for ease of description, and are not used to limit a scope of the embodiments of this application, and also indicate a sequence. The term "and/or" describes an association relationship between associated objects and indicates that three relationships may exist. For example, A and/or B may indicate the following three cases: Only A exists, both A and B exist, and only B exists. The character "I" usually indicates an "or" relationship between the associated objects. "At least one" means one or more. At least two means two or more. "At least one", "any one", or a similar expression thereof means any combination of the items, including any combination of singular items (pieces) or plural items (pieces). For example, at least one (piece, or type) of a, b, or c may indicate: a, b, c, a and b, a and c, b and c, or a, b, and c, where a, b, and c may be singular or plural. "A plurality of" means two or more, and another quantifier is similar to this. In addition, an element that appears in singular forms "a", "an", and "the" does not mean "one or only one" unless otherwise specified in the context, but means "one or more". For example, "a device" means one or more such devices.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions through a general-purpose processor, a digital signal processor, an application specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by using a combination of computing apparatuses, for example, a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Optionally, the storage medium may alternatively be integrated into the processor. The processor and the storage medium may be disposed in an ASIC.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although this application is described with reference to specific features and the embodiments thereof, it is clear that various modifications and combinations may be made to them without departing from the spirit and scope of this application. Correspondingly, this specification and the accompanying drawings are merely descriptions of examples of this application defined by the appended claims, and are intended to cover any of or all modifications, variations, combinations, or equivalents within the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A random access method, comprising:
   obtaining, by a terminal device, a position of the terminal device and a position of a network device;
   determining, by the terminal device, a time adjustment value based on the position of the terminal device and the position of the network device; and
   sending, by the terminal device, a random access preamble via a first message (MSG 1) based on the time adjustment value and a random access channel (RACH) resource configured by the network device; and
   sending, by the terminal device, the time adjustment value or an adjusted time adjustment value to the network device through a third message (MSG 3) from the terminal device to the network device, a fourth message from the terminal device to the network device or a combined message (MSG A) as a combination of the first message (MSG 1) and the third message (MSG 3), wherein the adjusted time adjustment value is obtained by the terminal device by adjusting the time adjustment value,
   wherein the method further comprises:
   receiving, by the terminal device, a scheduling delay and an uplink grant from the network device, wherein the scheduling delay and the uplink grant indicate a time domain position for sending the MSG 3; or
   receiving, by the terminal device, a scheduling delay from the network device, wherein the scheduling delay indicates a time domain position for sending the MSG 3.

2. The random access method according to claim 1, further comprising:
   prior to sending the adjusted time adjustment value to the network device, obtaining, by the terminal device, the adjusted time adjustment value by adjusting the time adjustment value based on a timing advance carried in a second message (MSG 2) received from the network device.

3. The random access method according to claim 1, wherein the determining of the time adjustment value based on the position of the terminal device and the position of the network device comprises:
receiving, by the terminal device, a timing advance from the network device, and determining, by the terminal device, the time adjustment value based on the position of the terminal device, the position of the network device, and the timing advance; or
determining, by the terminal device, the time adjustment value based on the position of the terminal device, the position of the network device, and a first receiving time, wherein the first receiving time is a time at which the network device expects to receive the random access preamble.

4. The random access method according to claim 1, further comprising:
when receiving from the network device both the scheduling delay and the uplink grant that indicate the time domain position for sending the MSG 3, sending, by the terminal device, the MSG 3 to the network device based on the scheduling delay and the uplink grant; or
when receiving from the network device the scheduling delay indicating the time domain position for sending the MSG 3, sending, by the terminal device, the MSG 3 to the network device based on the scheduling delay.

5. The random access method according to claim 4, wherein the scheduling delay is carried in a random access response for the random access preamble;
the scheduling delay is sent by the network device through broadcast; or
the scheduling delay is sent by the network device through control signaling.

6. The random access method according to claim 1, wherein the method further comprises:
determining, by the terminal device, a time offset based on the position of the terminal device and the position of the network device; and
after the time offset from a time point at which the terminal device sends the random access preamble, starting, by the terminal device, a time window for receiving the MSG 2.

7. A random access method, comprising:
broadcasting, by a network device, a random access channel (RACH) resource; and
receiving, by the network device, a random access preamble via a first message (MSG 1) from a terminal device, wherein the random access preamble is sent based on a selected RACH resource and a time adjustment value, and the time adjustment value is determined based on a position of the terminal device and a position of the network device;
sending a first timing advance carried in a second message (MSG 2) to the terminal device; and
receiving, by the network device, the time adjustment value or an adjusted time adjustment value from the terminal device through a third message (MSG 3) from the terminal device to the network device, a fourth message from the terminal device to the network device, or a combined message (MSG A) as a combination of the first message (MSG 1) and the third message (MSG 3), wherein the adjusted time adjustment value is obtained by the terminal device by adjusting the time adjustment value based on the first timing advance sent by the network device,
wherein the method further comprises;
sending, by the network device, a scheduling delay and an uplink grant to the terminal device, wherein the scheduling delay and the uplink grant indicate a time domain position for sending the MSG 3; or
sending, by the network device, a scheduling delay to the terminal device, wherein the scheduling delay indicates a time domain position for sending the MSG 3.

8. The random access method according to claim 7, further comprising:
sending, by the network device, a second timing advance to the terminal device, wherein the second timing advance determines the time adjustment value; or
sending, by the network device, a first receiving time to the terminal device, wherein the first receiving time is a time at which the network device expects to receive the random access preamble, and the first receiving time determines the time adjustment value.

9. The random access method according to claim 1, further comprising:
sending, by the network device, a random access response for the random access preamble to the terminal device, wherein the random access response comprises the scheduling delay;
broadcasting, by the network device, the scheduling delay to the terminal device; or
sending, by the network device, a control signal to the terminal device, wherein the control signal comprises the scheduling delay.

10. A random access apparatus, comprising:
one or more processors;
a communication interface; and
a non-transitory computer readable memory, storing a computer program including instructions that, when executed by the one or more processors, cause the random access apparatus to perform operations comprising:
obtaining a position of the random access apparatus and a position of a network device, and determining a time adjustment value based on the position of the random access apparatus and the position of the network device; and
sending a random access preamble via a first message (MSG 1) based on the time adjustment value and a random access channel (RACH) resource configured by the network device; and
sending the time adjustment value or an adjusted time adjustment value to the network device through a third message (MSG 3) from the random access apparatus to the network device, a fourth message from the random access apparatus to the network device or a combined message (MSG A) as a combination of the first message (MSG 1) and the third message (MSG 3), wherein the adjusted time adjustment value is obtained by the random access apparatus by adjusting the time adjustment value,
wherein the operations further comprise:
receiving a scheduling delay and an uplink grant from the network device, wherein the scheduling delay and the uplink grant indicate a time domain position for sending the MSG 3, or
receiving a scheduling delay from the network device, wherein the scheduling delay indicates a time domain position for sending the MSG 3.

11. The random access apparatus according to claim 10, wherein the computer program further includes instructions that, when executed by the one or more processors, cause the random access apparatus to further perform operations comprising:

prior to sending the adjusted time adjustment value to the network device, obtaining the adjusted time adjustment value by adjusting the time adjustment value based on a timing advance carried in a second message (MSG 2) received from the network device.

12. The random access apparatus according to claim 10, wherein the computer program further includes instructions that, when executed by the one or more processors, cause the random access apparatus to further perform operations comprising:

receiving a timing advance from the network device, and determining the time adjustment value based on the position of the random access apparatus, the position of the network device, and the timing advance; or determining the time adjustment value based on the position of the random access apparatus, the position of the network device, and a first receiving time, wherein the first receiving time is a time at which the network device expects to receive the random access preamble.

13. The random access apparatus according to claim 10, wherein the computer program further includes instructions that, when executed by the one or more processors, cause the random access apparatus to further perform operations comprising:

when receiving from the network device both the scheduling delay and the uplink grant that indicate the time domain position for sending the MSG 3, sending the MSG 3 to the network device based on the scheduling delay and the uplink grant; or when receiving from the network device the scheduling delay indicating the time domain position for sending the MSG 3, sending the MSG 3 to the network device based on the scheduling delay.

14. The random access apparatus according to claim 13, wherein the scheduling delay is carried in a random access response for the random access preamble;

the scheduling delay is sent by the network device through broadcast; or the scheduling delay is sent by the network device through control signaling.

15. The random access apparatus according to claim 10, wherein the computer program further includes instructions that, when executed by the one or more processors, cause the random access apparatus to further perform operations comprising:

determining a time offset based on the position of the random access apparatus and the position of the network device; and after the time offset from a time point at which the random access preamble is sent, starting a time window for receiving the MSG 2.

16. A random access apparatus, comprising:
one or more processors;
a communication interface; and
a non-transitory computer readable memory, storing a computer program including instructions that, when executed by the one or more processors, cause the random access apparatus to perform operations comprising:

broadcasting a random access channel (RACH) resource; and receiving a random access preamble via a first message (MSG 1) from a terminal device, wherein the random access preamble is sent based on a selected RACH resource and a time adjustment value, and the time adjustment value is determined based on a position of the terminal device and a position of the random access apparatus;

sending a first timing advance carried in a second message (MSG 2) to the terminal device; and receiving, by the random access apparatus, the time adjustment value or an adjusted time adjustment value from the terminal device through a third message (MSG 3) from the terminal device to the random access apparatus, a fourth message from the terminal device to the random access apparatus or a combined message (MSG A) as a combination of the first message (MSG 1) and the third message (MSG 3), wherein the adjusted time adjustment value is obtained by the terminal device by adjusting the time adjustment value based on the first timing advance sent by the random access apparatus, wherein the computer program further includes instructions that, when executed by the one or more processors, cause the random access apparatus to further perform operations comprising:

sending a scheduling delay and an uplink grant to the terminal device, wherein the scheduling delay and the uplink grant indicate a time domain position for sending the MSG 3; or sending a scheduling delay to the terminal device, wherein the scheduling delay indicates a time domain position for sending the MSG 3.

17. The random access apparatus according to claim 16, wherein the computer program further includes instructions that, when executed by the one or more processors, cause the random access apparatus to further perform operations comprising:

sending a second timing advance to the terminal device, wherein the second timing advance determines the time adjustment value; or sending a first receiving time to the terminal device, wherein the first receiving time is a time at which the random access apparatus expects to receive the random access preamble, and the first receiving time determines the time adjustment value.

18. The random access apparatus according to claim 16, wherein the computer program further includes instructions that, when executed by the one or more processors, cause the random access apparatus to further perform operations comprising:

sending a random access response for the random access preamble to the terminal device, wherein the random access response comprises the scheduling delay;

broadcasting the scheduling delay to the terminal device; or sending a control signal to the terminal device, wherein the control signal comprises the scheduling delay.

* * * * *